United States Patent
Asada et al.

(10) Patent No.: US 8,528,525 B2
(45) Date of Patent: Sep. 10, 2013

(54) FUEL INJECTION CONTROLLING SYSTEM OF INTERNAL COMBUSTION ENGINE

(75) Inventors: Yukihiro Asada, Wako (JP); Kenichi Machida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/917,493

(22) Filed: Nov. 2, 2010

(65) Prior Publication Data
US 2011/0100331 A1   May 5, 2011

(30) Foreign Application Priority Data
Nov. 5, 2009  (JP) ................................ 2009-253966

(51) Int. Cl.
*F02D 41/04* (2006.01)

(52) U.S. Cl.
USPC ............ 123/478; 701/103; 123/361; 123/376

(58) Field of Classification Search
USPC ................. 701/102–105, 110, 114; 123/361, 123/363, 376, 399, 403, 478
See application file for complete search history.

(56) References Cited

U.S. PATENT DOCUMENTS

| | | | | |
|---|---|---|---|---|
| 4,487,190 A | * | 12/1984 | Isobe | 123/492 |
| 4,622,637 A | * | 11/1986 | Tomita et al. | 701/64 |
| 4,903,660 A | * | 2/1990 | Sogawa | 123/339.14 |
| 5,090,380 A | * | 2/1992 | Suzuki et al. | 123/339.13 |
| 5,205,255 A | * | 4/1993 | Yamagata et al. | 123/339.13 |
| 5,450,830 A | * | 9/1995 | Katoh | 123/443 |
| 5,477,826 A | * | 12/1995 | Hara et al. | 123/339.16 |
| 5,511,412 A | * | 4/1996 | Campbell et al. | 73/114.25 |
| 6,267,099 B1 | * | 7/2001 | Yamada et al. | 123/396 |
| 6,467,459 B2 | * | 10/2002 | Machida et al. | 123/492 |
| 6,594,987 B2 | * | 7/2003 | Uranishi | 60/277 |
| 7,011,604 B2 | * | 3/2006 | Watanabe et al. | 477/110 |
| 7,143,741 B2 | * | 12/2006 | Yagi | 123/339.11 |

(Continued)

FOREIGN PATENT DOCUMENTS

| | | |
|---|---|---|
| JP | 01-121532 | 5/1989 |
| JP | 01121532 A * | 5/1989 |
| JP | 11-270395 | 10/1999 |
| JP | 11270384 A * | 10/1999 |
| JP | 11270389 A * | 10/1999 |

(Continued)

OTHER PUBLICATIONS

English translation of JP 11270395 A, Nishino et al. Oct. 1999.*

(Continued)

*Primary Examiner* — Stephen K Cronin
*Assistant Examiner* — Joseph Dallo
(74) *Attorney, Agent, or Firm* — Ditthavong Mori & Steiner, P.C.

(57) ABSTRACT

A fuel injection controlling system includes an accelerator manipulator. An accelerator manipulated variable detection sensor is configured to detect a manipulated variable of the accelerator manipulator. A rotation speed sensor is configured to detect a rotation speed of an engine. A throttle valve drive motor is configured to open and close the throttle valve in response to the manipulated variable. A controller is configured to control the throttle valve drive motor and to compute basic injection time (Ti) of fuel. A memory is configured to memorize, as a carbon adhesion judgment value (IXREF), a throttle opening degree ($\theta$TH) at a moment when a rotation speed (Ne) detected with the rotation speed sensor reaches a target idle rotation speed (NeIdle) by increasing the throttle opening degree ($\theta$TH). A corrector is configured to correct Ti with IXREF to correct an air-fuel ratio toward a leaner side as IXREF increases.

12 Claims, 6 Drawing Sheets

(56) References Cited

U.S. PATENT DOCUMENTS

| | | | |
|---|---|---|---|
| 7,169,078 B2 * | 1/2007 | Ishikawa et al. | 477/102 |
| 7,210,450 B2 * | 5/2007 | Arinaga et | 123/339.19 |
| 7,401,595 B2 * | 7/2008 | Kimura et al. | 123/490 |
| 7,418,946 B2 * | 9/2008 | I et al. | 123/406.45 |
| 7,717,084 B2 * | 5/2010 | Kurotani et al. | 123/295 |
| 2004/0060542 A1 * | 4/2004 | Wayama et al. | 123/399 |
| 2004/0134463 A1 * | 7/2004 | Chong et al. | 123/399 |
| 2007/0235006 A1 * | 10/2007 | Nishigaki et al. | 123/339.1 |
| 2008/0066716 A1 * | 3/2008 | Asano | 123/305 |
| 2008/0072878 A1 * | 3/2008 | Kokubu | 123/486 |
| 2008/0115762 A1 * | 5/2008 | Hiraku et al. | 123/339.14 |

FOREIGN PATENT DOCUMENTS

| | | | | |
|---|---|---|---|---|
| JP | 11270395 | A | * | 10/1999 |
| JP | 2000087789 | A | * | 3/2000 |
| JP | 2000257490 | A | * | 9/2000 |
| JP | 2001073845 | A | * | 3/2001 |
| JP | 2002-081337 | | | 3/2002 |
| JP | 2002081337 | A | * | 3/2002 |
| JP | 2003065134 | A | * | 3/2003 |
| JP | 4056413 | B2 | | 10/2004 |

OTHER PUBLICATIONS

Japanese Office Action for corresponding JP Application No. 2009-253966, Nov. 2, 2012.

* cited by examiner

FUEL INJECTION CONTROLLING SYSTEM OF INTERNAL COMBUSTION ENGINE

CROSS-REFERENCE TO RELATED APPLICATIONS

The present application claims priority under 35 U.S.C. §119 to Japanese Patent Application No. 2009-253966, filed Nov. 5, 2009. The contents of this application are incorporated herein by reference in their entirety.

BACKGROUND OF THE INVENTION

1. Technical Field

The present invention relates to a fuel injection controlling system of an internal combustion engine.

2. Background Art

An internal combustion engine (hereunder referred to as "engine") to feed intake air volume by operating an IAVC (Idle Air Control Valve) or the like in an idle speed region is known. Meanwhile, a technology of controlling the intake air volume in an idle speed region by a TBW (Throttle By Wire) method is also known. In the TBW method, the variable of an accelerator grip manipulated by a user, namely an accelerator opening degree, is detected and a throttle valve motor to open and close a throttle valve is driven based on the detected accelerator opening degree.

In the meantime, the distance between a combustion chamber and a throttle valve is shorter in the intake system of a motorcycle than in that of a four-wheeled vehicle. Moreover, the valve overlap of intake and exhaust valves increases in the case of a higher output engine or the like. When an engine is used for a long period of time in a motorcycle having such features, it may be sometimes required particularly to take it into consideration that: carbon blown back from the side of a combustion chamber to an intake air path adheres to a throttle valve; an intake air quantity characteristic to a throttle opening degree changes; and an air-fuel ratio deviates to a side richer than anticipated.

In view of such a situation, for example Japanese Patent No. 4056413 proposes an idle rotation speed controller of an engine that can grasp the situation of carbon accumulation and correct the opening degree of a throttle valve on the basis of a learned value of a throttle opening degree.

A conventional controller described in Japanese Patent No. 4056413 is a device that corrects carbon in order to maintain an idle rotation speed in a normal state and is not a device that corrects an injected fuel quantity in other operation regions. Particularly in a motorcycle wherein throttle operation is manually applied therefore, there has been room for further improvement in order to satisfy a user sensitive to an engine output characteristic in a low throttle opening degree region exceeding an idling region. In the case of computing a basic injection quantity by using an engine rotation speed (Ne)—intake air vacuum (Pb) map or an Ne—throttle opening degree (Th) map in particular, it has been particularly wanted that the injected fuel quantity is changed smoothly without a feeling of strangeness when the Nb—Pb map is switched to the Ne—Th map during low load operation.

SUMMARY OF THE INVENTION

According to one aspect of the present invention, a fuel injection controlling system of an internal combustion engine includes an accelerator manipulator, an accelerator manipulated variable detection sensor, a rotation speed sensor, a throttle valve, a throttle valve drive motor, a throttle opening degree sensor, and a controller. The accelerator manipulated variable detection sensor is configured to detect a manipulated variable of the accelerator manipulator. The rotation speed sensor is configured to detect a rotation speed of the internal combustion engine. The throttle valve drive motor is configured to open and close the throttle valve in response to the manipulated variable of the accelerator manipulator. The throttle opening degree sensor is configured to detect an opening degree of the throttle valve. The controller is configured to control the throttle valve drive motor and to compute basic injection time (Ti) of fuel. The controller includes a memory and a corrector. The memory is configured to memorize, as a carbon adhesion judgment value (IXREF), a throttle opening degree ($\theta$TH) at a moment when a rotation speed (Ne) detected with the rotation speed sensor reaches a target idle rotation speed (NeIdle) by increasing the throttle opening degree ($\theta$TH). The corrector is configured to correct the basic injection time (Ti) with the carbon adhesion judgment value (IXREF) so as to correct an air-fuel ratio toward a leaner side as the carbon adhesion judgment value (IXREF) increases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 2:
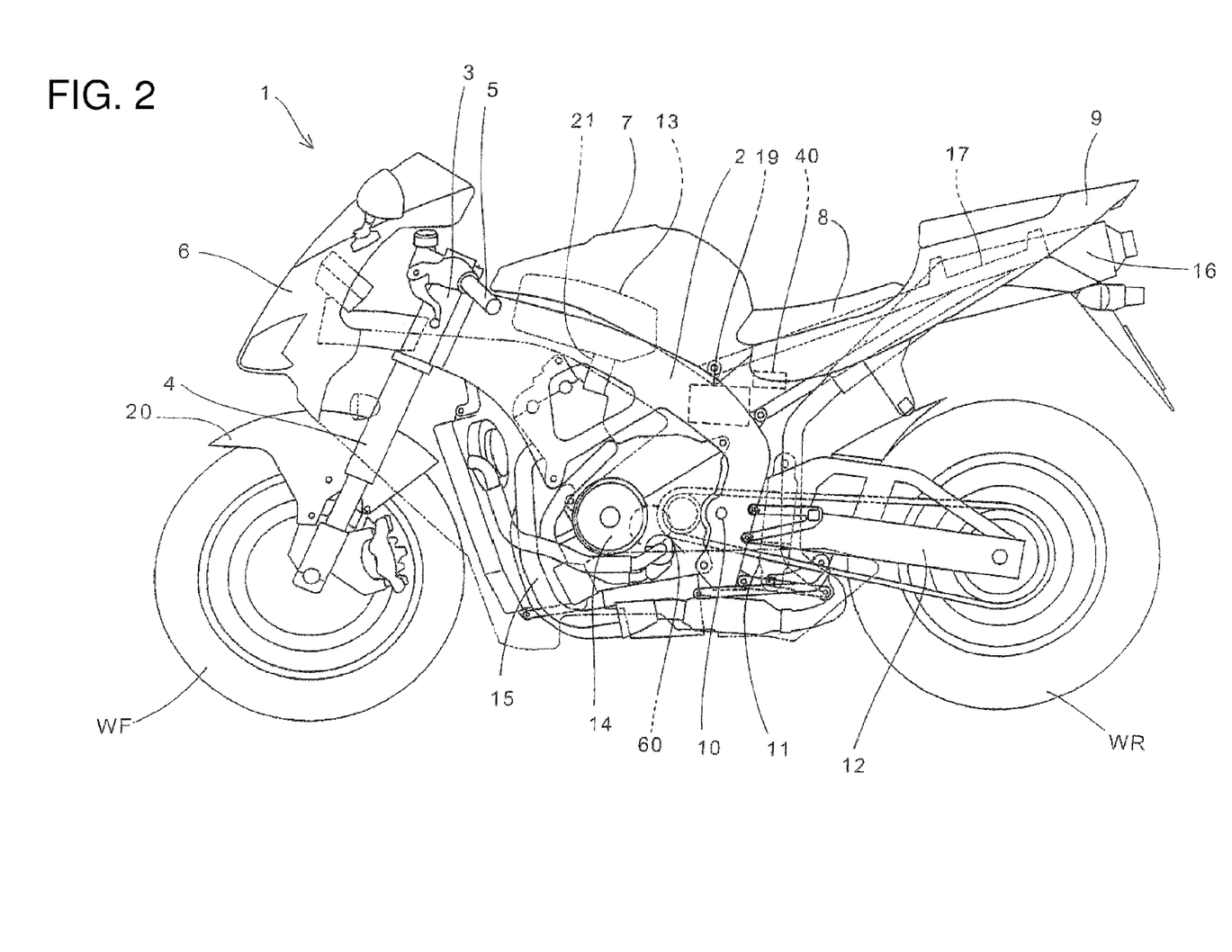
FIG. 2 is a side view of a motorcycle on which a fuel injection controlling system according to an embodiment of the present invention is mounted.

An embodiment according to the present invention is hereunder explained in reference to drawings. FIG. 2 is a left side view of a motorcycle 1 to which an engine output controller according to an embodiment of the present invention is applied. A steering stem (not shown in drawing) is rotatably pivotally supported by a head pipe 3 disposed at the front end portion of a mainframe 2. Laterally paired front forks 4 to pivotally support a front wheel WF are attached to the steering stem and the front wheel WF is configured so as to be steered with laterally paired handlebars 5 attached to the top ends of the front forks 4.

A swing arm 12 is pivotally supported vertically swingably by a pivot shaft 10 at the rear bottom portion of the mainframe 2 and a rear wheel WR as a drive wheel is pivotally supported at the rear end portion of the swing arm 12. Between the swing arm 12 and the mainframe 2, a rear cushion 11 to connect them to each other through a link mechanism is disposed.

An engine 14 is disposed in front of the pivot shaft 10 and below the mainframe 2. A multistage transmission 60 of six stages for example is contained in the interior of the engine 14. An intake pipe 21 including a fuel injector and a throttle body is attached to the upper portion of the engine 14 and an air cleaner box 13 is connected to the upper portion thereof. An exhaust pipe 15 to lead the combustion gas of the engine 14 to a muffler 16 disposed at the vehicle body rear end portion is attached to the front side of the engine 14.

A front cowl 6 is disposed on the front side of the head pipe 3 and a front fender 20 is disposed above the front wheel WF. A fuel tank 7 is disposed at the upper portion of the mainframe 2. A seat 8 and a seat cowl 9 are attached to a seat frame 17 extending upward and rearward from the mainframe 2. A battery 19 and an ECU 40 are disposed below the seat 8.

Figure 3:
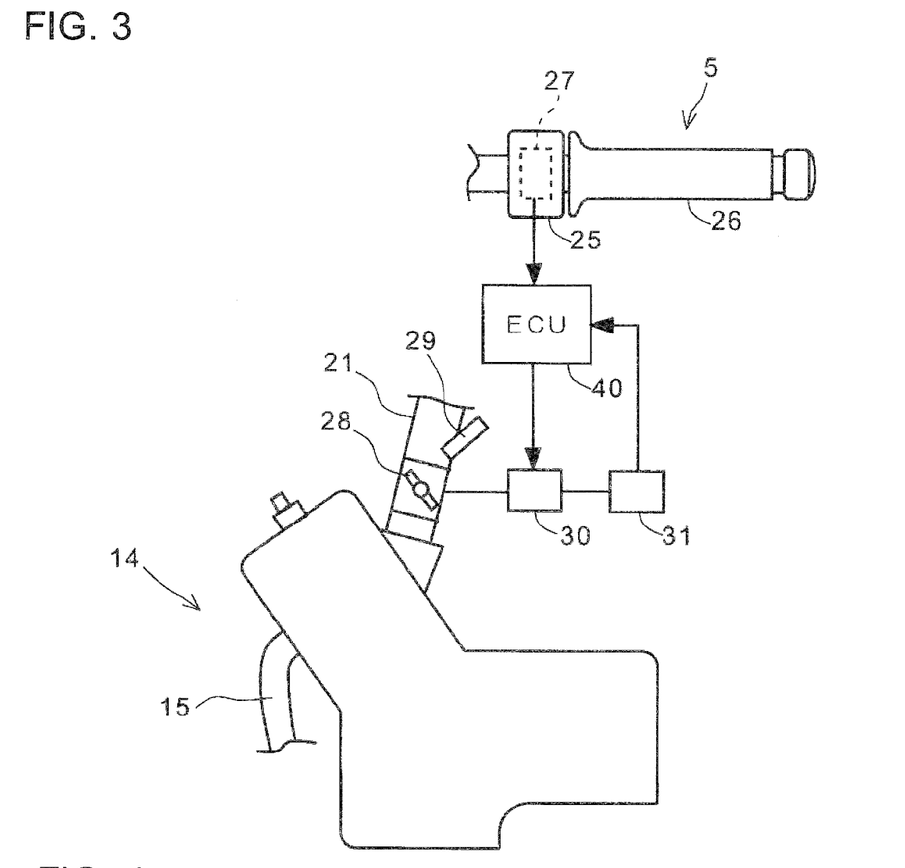
FIG. 3 is a block diagram showing the configuration of a throttle-by-wire mechanism.

FIG. 3 is a block diagram showing the configuration of a throttle-by-wire mechanism used in a motorcycle and the reference signs identical to those shown in FIG. 2 represent identical or equivalent parts, respectively. A throttle-by-wire mechanism to drive a throttle valve 28 to change the path area of an intake pipe 21 with a throttle valve motor 30 is applied to the motorcycle 1. An injector 29 of the fuel injector is disposed on the upstream side of the throttle valve 28.

The rotation angle of an accelerator grip 26 as an accelerator manipulator that is attached to a handlebar 5 on the right side of the vehicle body and rotatably manipulated by a rider is detected with an accelerator opening degree sensor 27 that is an accelerator manipulated variable detection sensor in a switch box 25 located on the left side of the accelerator grip 26, and transmitted to an ECU 40. The ECU 40 activates the throttle valve motor 30 and computes a basic injection time Ti for deciding the quantity of a fuel supplied by the injector 29 based on the rotation angle of the accelerator grip 26 and the output signals of various sensors. The rotation angle of the throttle valve 28 is detected with a throttle opening degree sensor 31 and transmitted to the ECU 40. Further, the ECU 40 also carries out deterioration correction to correct the basic injection time Ti in consideration of carbon adhesion as it will be stated later.

Figure 4:
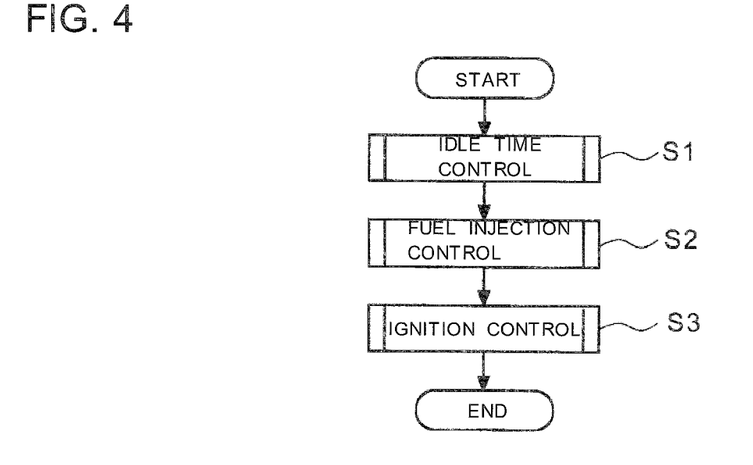
FIG. 4 is a general flowchart showing the whole operation of a fuel injection controlling system.

FIG. 4 is a general flowchart showing the substantial operations of the ECU 40. In FIG. 4, idle time control is carried out at Step S1. Here, the idle time control means the control of detecting the throttle opening degree when a target idle rotation speed NeIdle converges in the process for converging an engine rotation speed on a prescribed target idle rotation speed NeIdle (this will be described later in reference to FIG. 5). Fuel injection control is carried out at Step S2. The fuel injection control is the control of computing a basic injection time Ti that determines the quantity of a fuel injected by a fuel injection valve 29 in response to a throttle opening degree $\theta TH$, and includes deterioration correction for decreasing the influence of carbon adhering to an intake pipe 21 and a throttle valve 28 by blowing back from a combustion chamber (this will be described later in reference to FIGS. 6 and 7).

Ignition control is carried out at Step S3. The ignition control is the control of an advance angle, a delay angle, or the like of ignition timing in response to the changes of an engine rotation speed Ne and a throttle opening degree $\theta TH$ and others, thus a known technology can be applied, and hence detailed explanations are omitted.

Figure 5:
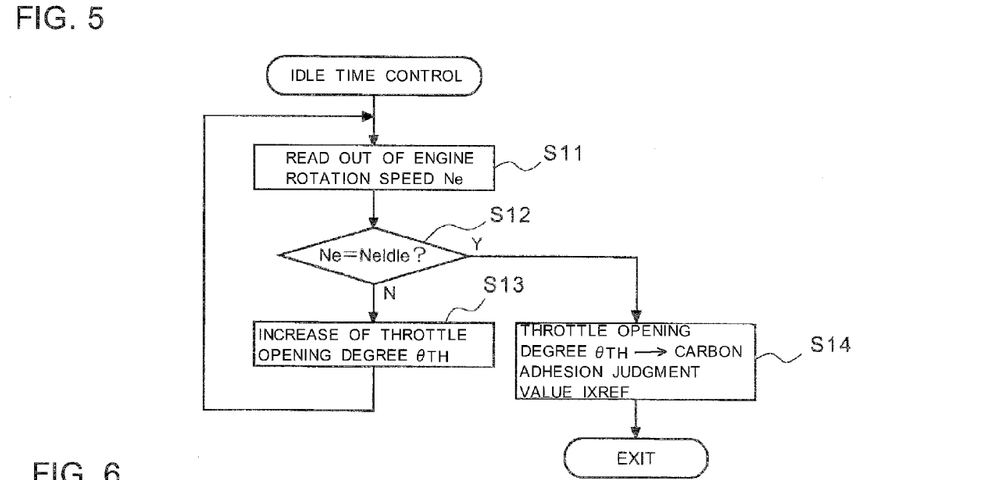
FIG. 5 is a flowchart showing the process of idle time control in the fuel injection controlling system.

FIG. 5 is a flowchart showing an example of the idle time control. In FIG. 5, a signal representing an engine rotation speed Ne that is an output of an engine rotation speed sensor is read at Step S11. At Step S12, whether or not the engine rotation speed Ne read at Step S11 has increased up to a target idle rotation speed NeIdle is judged.

In the case where the judgment is negative at Step S12, the procedure advances to Step S13 and an instruction to increase a throttle opening degree $\theta TH$ up to a prescribed opening degree is supplied to a throttle valve motor 30. If the opening degree of a throttle valve 28 increases and an engine rotation speed Ne reaches a target idle rotation speed NeIdle, the judgment is affirmative at Step S12, and hence the procedure advances to Step S14. At Step S14, a throttle opening degree $\theta TH$ representing air volume necessary for maintaining the engine rotation speed at the target idle rotation speed at the moment is memorized as a carbon adhesion judgment value IXREF.

Figure 6:
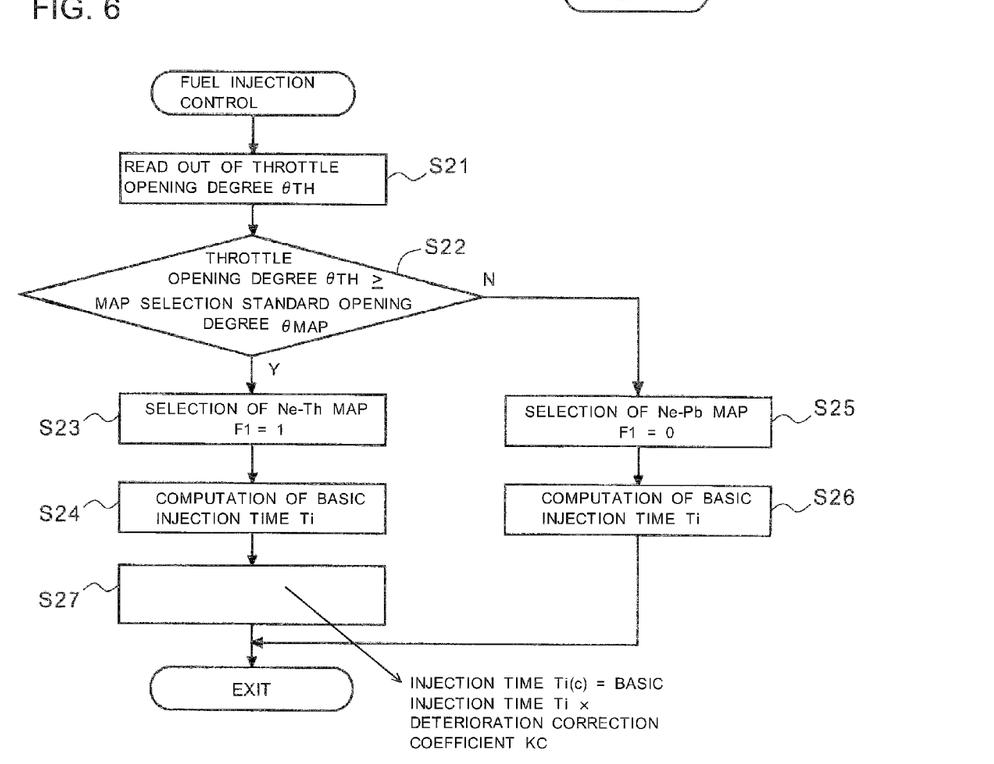
FIG. 6 is a flowchart showing the process of fuel injection control in the fuel injection controlling system.

FIG. 6 is a flowchart showing an example of the fuel injection control. In FIG. 6, a throttle opening degree $\theta TH$ that is an output of a throttle opening degree sensor 31 is read at Step S21. At Step S22, whether or not the throttle opening degree $\theta TH$ is not less than a map selection standard opening degree $\theta MAP$ (for example, 3°) is judged. The map selection standard opening degree $\theta MAP$ is a standard value for selecting one from plural maps in order to compute a basic injection time Ti of a fuel in response to the magnitude of the throttle opening degree $\theta TH$.

In the case where a throttle opening degree $\theta TH$ is not less than a map selection standard opening degree $\theta MAP$, the procedure advances to Step S23, an Ne—Th map to compute a basic injection time Ti in response to an engine rotation speed Ne is selected, and a map flag F1 is set at "1". At Step S24, a basic injection time Ti is computed by using the Ne—Th map.

In the case where a throttle opening degree $\theta TH$ is less than a map selection standard opening degree $\theta MAP$, the procedure advances to Step S25, an Ne—Pb map to compute a basic injection time Ti in response to intake pipe internal vacuum Pb is selected, and the map flag F1 is set at "0". At Step S26, a basic injection time Ti is computed by using the Ne—Pb map in response to the intake pipe internal vacuum Pb detected with a vacuum sensor. The vacuum sensor is disposed in an intake pipe 21 and is a known component.

The Ne—Th map is a three-dimensional map to obtain a basic injection time Ti in response to an engine rotation speed Ne and a throttle opening degree $\theta TH$ and the Ne—Pb map is a three-dimensional map to obtain a basic injection time Ti in response to an engine rotation speed Ne and intake pipe internal vacuum Pb.

In the case where a throttle opening degree $\theta TH$ is not less than a map selection standard opening degree $\theta MAP$, an Ne—Th map is selected, and a basic injection time Ti is computed, the deterioration correction of the basic injection time Ti is carried out by using a carbon adhesion judgment value IXREF at Step S27. The deterioration correction is carried out by multiplying a fuel injection time TiO by a deterioration correction coefficient KC. In the case where a throttle opening degree $\theta TH$ is less than a map selection standard opening degree $\theta MAP$, the deterioration correction of a basic injection time Ti is not carried out.

Here, the detection error of intake air volume caused by carbon adhesion appears conspicuously when a throttle opening degree $\theta TH$ is small. Consequently, the deterioration correction coefficient KC is decided as a value obtained by further adding a corrective subtraction value throttle correction value KC2 responding to a throttle opening degree $\theta TH$ to a corrective subtraction value KC1 responding to a carbon adhesion judgment value IXREF.

Figure 7:
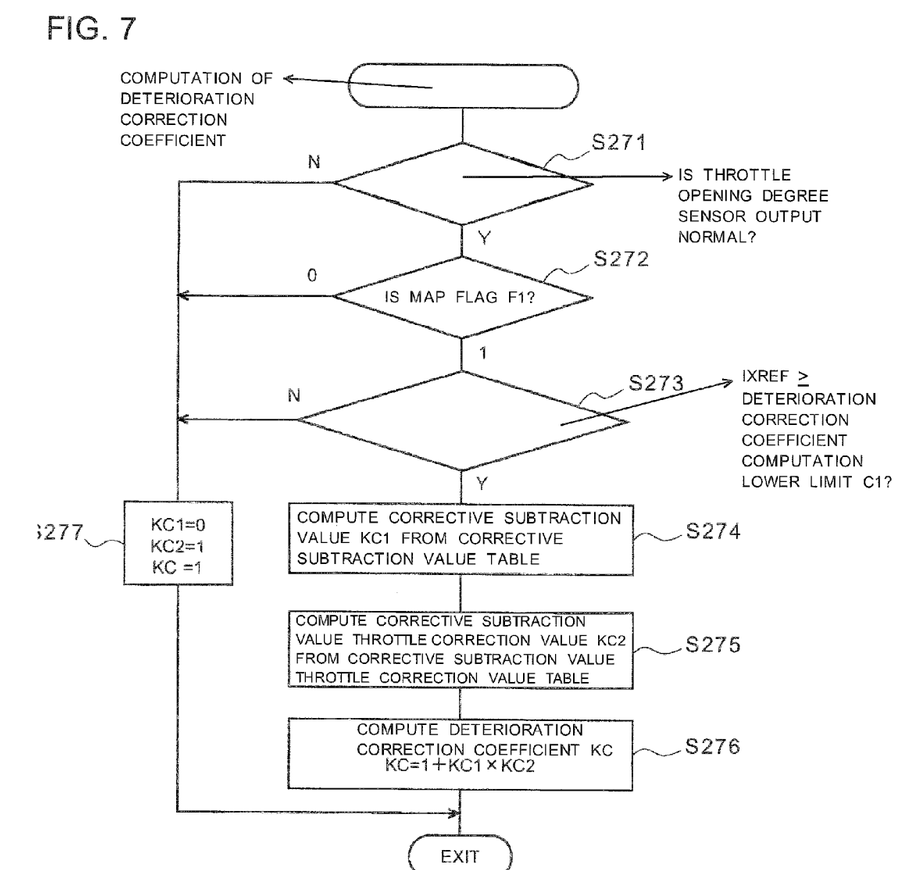
FIG. 7 is a flowchart related to deterioration correction in fuel injection control.

FIG. 7 is a flowchart showing the process for computing a deterioration correction coefficient. In the process of the flowchart, an injection time Ti (C) is obtained by computing a corrective subtraction value KC1 and a corrective subtraction value throttle correction value KC2, and correcting a basic injection time Ti by a deterioration correction coefficient KC computed based on the computations.

In FIG. 7, whether or not an output of a throttle opening degree sensor 31 is in a normal range is judged at Step S271. In the case where the output of the throttle opening degree sensor 31 is in a normal range at Step S271, the procedure advances to Step S272 and a map flag F1 is distinguished. In the case where the map flag F1 is "1", namely an Ne—Th map is selected, the procedure advances to Step S273 and whether or not a carbon adhesion judgment value IXREF is not less than a deterioration correction coefficient computation lower limit C1 is judged.

In the case where the judgment is affirmative at Step S273, the procedure advances to Step S274, a corrective subtraction value table for obtaining a corrective subtraction value KC1 is searched based on the carbon adhesion judgment value IXREF, and the corrective subtraction value KC1 to correct the deviation of intake air volume caused by carbon adhesion is computed. At Step S275, a corrective subtraction value throttle correction value table is searched based on a throttle opening degree θTH and a corrective subtraction value throttle correction value KC2 is computed.

At Step S276, a deterioration correction coefficient KC is computed by using a computation formula (Formula 1), $$KC = 1 + KC1 \times KC2 \quad \text{(Formula 1)}.$$

In any of the cases where an output of the throttle opening degree sensor 31 is not in a normal range, where a map flag F1 is "0", and where a carbon adhesion judgment value IXREF is not more than a deterioration correction coefficient computation lower limit C1, the procedure advances to Step S277, a corrective subtraction value KC1 is set at "0", the corrective subtraction value throttle correction value KC2 is set at "1", and a deterioration correction coefficient KC is set at "1". That is, deterioration correction is not applied to a basic injection time by the setting at Step S277.

Further, it is also possible to prescribe a throttle opening degree θTHidle corresponding to a target idle rotation speed Neidle beforehand, and apply deterioration correction to a basic injection time only in the case where the deviation of an actual engine rotation speed Ne from the target idle rotation speed Neidle is larger than a prescribed value (for example, 20%) when a throttle opening degree θTH comes to the throttle opening degree θTHidle. The prescribed value is a value obtained through an experiment beforehand.

Figure 10:
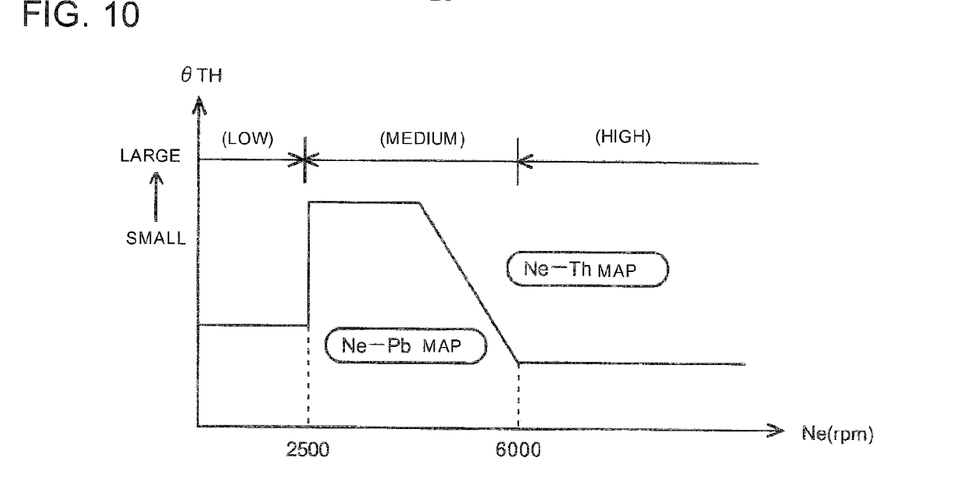
FIG. 10 is a view showing an example of a map selection standard value for switching maps in response to an engine rotation speed.

Here, it is possible to set a map selection standard opening degree θMAP at not a fixed value but a variable value corresponding to an engine rotation speed Ne. FIG. 10 is a view showing an example of a map selection standard opening degree θMAP corresponding to an engine rotation speed. In FIG. 10, the region of use of an Ne—Th map where a throttle opening degree θTH is used is expanded in order to improve the response to the change of a throttle opening degree when an engine rotation speed Ne is in a low rotation speed region (for example, 2,500 rpm or lower).

On the other hand, in a medium rotation speed region (for example, 2,500 to 6,000 rpm), an injected fuel quantity can be decided with a high degree of accuracy in the case of using an Ne—Pb map rather than an Ne—Th map and hence the map selection standard opening degree θMAP is raised further than that in the low rotation speed region in order to expand the Ne—Pb map region.

Meanwhile, in a high rotation speed region (for example, 6,000 rpm or higher), intake air volume increases, the computation accuracy of an injected fuel quantity obtained by using an Ne—Pb map lowers, and hence the map selection standard opening degree θMAP is lowered further than that in the low rotation speed region in order to expand the Ne—Th map region.

Figure 1:
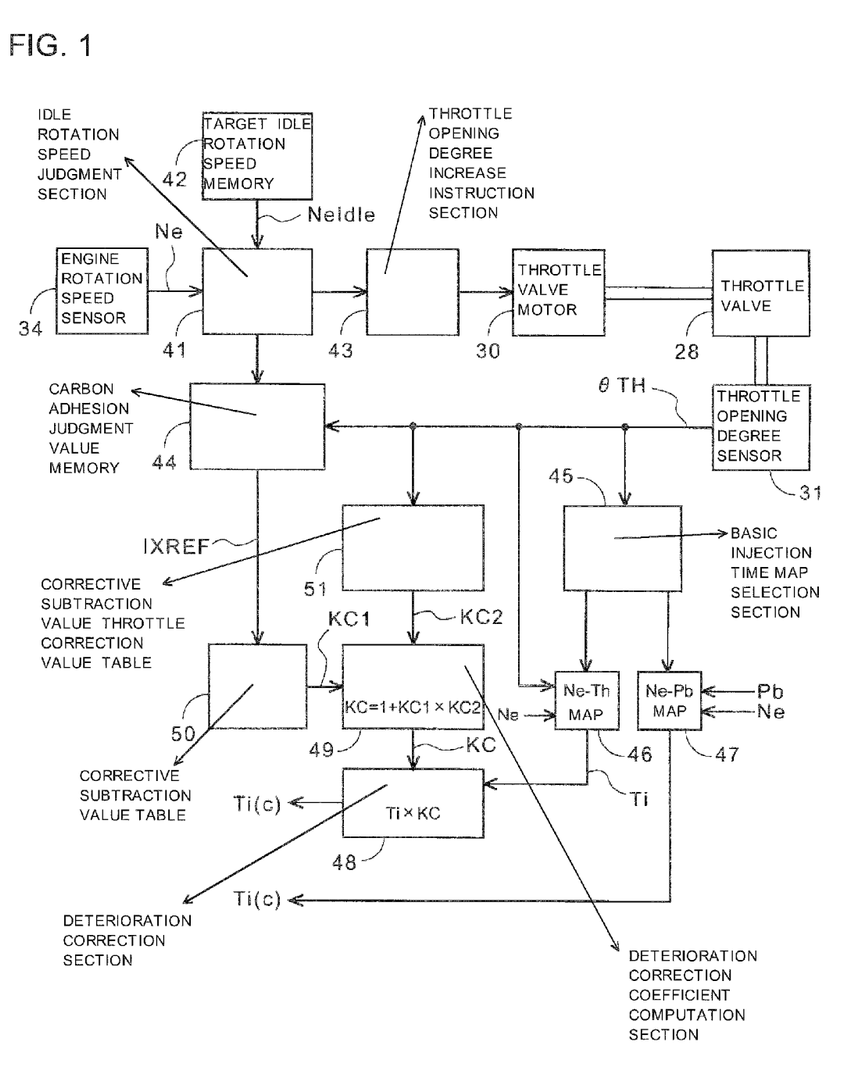
FIG. 1 is a block diagram showing the functions of substantial parts in a fuel injection controlling system of an engine according to an embodiment of the present invention.

FIG. 1 is a block diagram showing the functions of substantial parts in an ECU 40 to carry out the process explained in relation to aforementioned flowcharts. The functions shown in drawing can be realized with a microprocessor except various sensors and motors and a throttle valve.

In FIG. 1, an idle rotation speed judgment section 41 compares an engine rotation speed Ne input from an engine rotation speed sensor 34 with a target idle rotation speed Neidle input from a target idle rotation speed memory 42. The idle rotation speed judgment section 41 inputs an instruction for increasing a throttle opening degree into a throttle opening degree increase instruction section 43 if the engine rotation speed Ne is lower than the target idle rotation speed Neidle. In contrast, if the engine rotation speed Ne reaches the target idle rotation speed Neidle, the idle rotation speed judgment section 41 memorizes the throttle opening degree θTH at the moment of the judgment as a carbon adhesion judgment value IXREF in a carbon adhesion judgment value memory 44.

A basic injection time map selection section 45 reads a throttle opening degree θTH from a throttle opening degree sensor 31 and selects an Ne—Th map 46 or an Ne—Pb map 47 in response to the throttle opening degree θTH and a map selection standard opening degree θMAP.

The Ne—Th map 46 outputs a basic injection time Ti based on an engine rotation speed Ne and a throttle opening degree θTH. The Ne—Pb map 47 outputs a basic injection time Ti based on an intake pipe internal vacuum Pb detected with an intake pipe negative pressure sensor (not shown in drawing) and an engine rotation speed Ne. The basic injection time Ti searched with either of the maps is input into a deterioration correction section 48 and correction is carried out with a deterioration correction coefficient KC.

The deterioration correction coefficient KC is computed by using a computation formula (Formula 1) at a deterioration correction coefficient computation section 49. A corrective subtraction value KC1 used in the computation formula (Formula 1) is supplied from a corrective subtraction value table 50. The corrective subtraction value table 50 outputs a corrective subtraction value KC1 in response to a carbon adhesion judgment value IXREF. A corrective subtraction value throttle correction value table 51 outputs a corrective subtraction value throttle correction value KC2 in response to a throttle opening degree θTH.

A deterioration correction coefficient KC computed at the deterioration correction coefficient computation section 49 is input into the deterioration correction section 48 and an injection time Ti (C) that is obtained by subjecting a basic injection time Ti to deterioration correction is computed by using a computation formula (Formula 2) and is output.

$$Ti(C) = Ti \times KC \quad \text{(Formula 2)}$$

Figure 8:
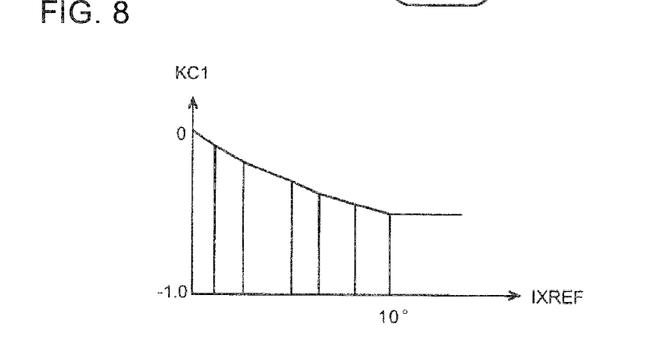
FIG. 8 is a view showing an example of a corrective subtraction value table.

FIG. 8 is a view showing an example of a corrective subtraction value table 50. In FIG. 8, the horizontal axis represents a carbon adhesion judgment value IXREF and the vertical axis represents a corrective subtraction value KC1. The corrective subtraction value KC1 is set as a negative value including "0" in response to a carbon adhesion judgment value IXREF. In the example, corrective subtraction values KC1s are set in response to six carbon adhesion judgment values IXREFs and hence a corrective subtraction value KC1 is obtained by interpolating values corresponding to the six judgment values IXREFs. The carbon adhesion judgment value IXREF decreases gradually from "0°" to "10°" but a value other than "0" is set.

Figure 9:
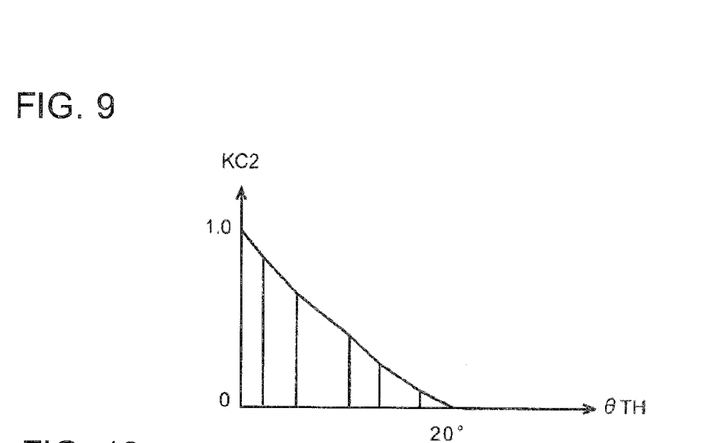
FIG. 9 is a view showing an example of a corrective subtraction value throttle correction value table.

FIG. 9 is a view showing an example of a corrective subtraction value throttle correction value table 51. In FIG. 9, the horizontal axis represents a throttle opening degree θTH and the vertical axis represents a corrective subtraction value throttle correction value KC2. The corrective subtraction value throttle correction value KC2 is set in the range of "0" to "1.0" in response to a throttle opening degree θTH. In the example, corrective subtraction value throttle correction values KC2s are set in response to six throttle opening degrees θTHs and hence a corrective subtraction value throttle correction value KC2 is obtained by interpolating values corresponding to the six throttle opening degrees θTHs. In the example, the corrective subtraction value throttle correction value KC2 is set so as to be "0" when the throttle opening degree θTH is "20°".

Although two correction coefficients, namely a corrective subtraction value KC1 and a corrective subtraction value throttle correction value KC2, are used for correcting deterioration caused by carbon adhesion in the above embodiment, the present invention is not limited to the embodiment and it is also possible to compute a deterioration correction coefficient KC by using only a corrective subtraction value KC1 and the following computation formula (Formula 3).

$$KC=1+KC1 \quad \text{(Formula 3)}$$

Further, although the present embodiment has been explained on the assumption of application to a motorcycle, the present invention is not limited to a motorcycle and can be used likewise for a fuel injection controlling system of an engine mounted on a three-wheeled vehicle, a four-wheeled vehicle, or the like. Furthermore, the present invention may be applied to not only a system of driving a throttle valve with a motor in response to a manipulated variable of an accelerator grip, but also a throttle-by-wire system of detecting a manipulated variable of lever operation or pedal operation and driving a throttle valve so as to open and close based on the manipulated variable.

The controller is provided with an Ne—Th map to obtain the basic injection time of the fuel based on the engine rotation speed and a throttle opening degree, an Ne—Pb map to obtain the basic injection time of the fuel based on the engine rotation speed and intake pipe internal vacuum, and a map selector to select the Ne—Pb map when the throttle opening degree is less than a prescribed map selection standard opening degree and select the Ne—Th map when the throttle opening degree is not less than the map selection standard opening degree; and is configured so that the correction of the basic injection time by the corrector is performed with respect to the basic injection time of the fuel computed by using the Ne—Th map.

Further, the corrector is configured so that the degree of the correction of the basic injection time toward a leaner side increases in response to the throttle opening degree as the throttle opening degree decreases.

Further, the corrector is activated when the throttle opening degree corresponding to a target idle rotation speed is output and a deviation between the target idle rotation speed and an actual engine rotation speed is larger than a prescribed value.

Further, the map selector is configured so as to use a value larger than values in the other regions as the map selection standard opening degree in a medium rotation speed region except a low rotation speed region including an idle rotation speed and a high rotation speed region including a maximum rotation speed out of all the regions of engine rotation speeds.

In the embodiment of the present invention, when an engine rotation speed comes to a target idle rotation speed, a throttle opening degree at the moment is memorized as a carbon adhesion judgment value and a basic injection time is corrected so as to shift an air-fuel ratio toward a leaner side as the carbon adhesion judgment value increases. Consequently, it is possible: not only to maintain an idle rotation speed but also to eliminate the influence of carbon adhesion over all the manipulation regions by a simple method; and hence to provide a method that allows a user of a motorcycle to be satisfied with the engine performance at a low throttle opening degree.

In the embodiment of the present invention, a basic injection time is corrected so as to change an air-fuel ratio toward a leaner side in accordance with a carbon adhesion judgment value only when an Ne—Th map that is used in a region where a throttle opening degree is larger than a prescribed value is used so that an air-fuel ratio is not rapidly changed to a richer side during the switching of maps to compute a basic injection time. By so doing, the change of an injected fuel quantity caused by the switching of the maps is smoothened without giving a feeling of strangeness to a user due to a large injection quantity caused when the injected fuel quantity obtained with the Ne—Pb map shifts to that obtained with the Ne—Th map.

Further, although the influence of carbon adhesion appears more conspicuously as a throttle opening degree decreases, by the embodiment of the present invention, it is possible to increase the degree of correction as the throttle opening degree decreases and hence improve the bias of intake air volume caused by carbon adhesion in conformity with the throttle opening degree.

In the embodiment of the present invention, a basic injection time is not corrected unless there exists a difference not less than a prescribed value (for example, 20%) between a target idle rotation speed and an actual rotation speed.

By the embodiment of the present invention, it is possible to select a map accurately in response to an engine characteristic at each region over all the rotation speed regions ranging from a low rotation speed region to a high rotation speed region.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A fuel injection controlling system of an internal combustion engine, comprising:
   an accelerator manipulator;
   an accelerator manipulated variable detection sensor configured to detect a manipulated variable of the accelerator manipulator;
   a rotation speed sensor configured to detect a rotation speed of the internal combustion engine;
   a throttle valve;
   a throttle valve drive motor configured to open and close the throttle valve in response to the manipulated variable of the accelerator manipulator;
   a throttle opening degree sensor configured to detect an opening degree of the throttle valve; and
   a controller configured to control the throttle valve drive motor and to compute basic injection time (Ti) of fuel, the controller comprising:

a memory configured to memorize, as a carbon adhesion judgment value (IXREF), a throttle opening degree (θTH) at a moment when a rotation speed (Ne) detected with the rotation speed sensor reaches a target idle rotation speed (NeIdle) by increasing the throttle opening degree (θTH);

a corrector configured to correct the basic injection time (Ti) with the carbon adhesion judgment value (IXREF) so as to correct an air-fuel ratio toward a leaner side as the carbon adhesion judgment value (IXREF) increases;

an Ne—Th map configured to obtain the basic injection time (Ti) of the fuel based on the rotation speed (Ne) and the throttle opening degree (θTH) of the internal combustion engine;

an Ne—Pb map configured to obtain the basic injection time (Ti) of the fuel based on an intake pipe internal negative pressure (Pb) and the throttle opening degree (θTH); and a map selector configured to select the Ne—Pb map when the throttle opening degree (θTH) is less than a prescribed map selection standard opening degree (θMAP) and to select the Ne—Th map when the throttle opening degree (θTH) is not less than the map selection standard opening degree (θMAP), wherein the controller is configured so that correction of the basic injection time by the corrector is performed with respect to the basic injection time (Ti) of the fuel computed by using the Ne—Th map, and wherein the controller is configured so that correction of the basic injection time by the corrector is not performed with respect to the basic injection time (Ti) of the fuel computed by using the Ne—Pb map.

2. The fuel injection controlling system of an internal combustion engine according to claim 1, wherein the corrector is configured so that a degree of correction of the basic injection time (Ti) toward a leaner side increases in response to the throttle opening degree (θTH) as the throttle opening degree (θTH) decreases.

3. The fuel injection controlling system of an internal combustion engine according to claim 1, wherein the corrector is activated when the throttle opening degree (θTH) that is output corresponds to a target idle rotation speed (Neidle) and a deviation between the target idle rotation speed (Neidle) and an actual engine rotation speed (Ne) is larger than a prescribed value.

4. The fuel injection controlling system of an internal combustion engine according to claim 1, wherein the map selector is configured so as to use a value as the map selection standard opening degree (θMAP) in a medium rotation speed region among all regions of engine rotation speeds (Ne) including a low rotation speed region including an idle rotation speed and a high rotation speed region including a maximum rotation speed, the value being larger than values in the low rotation speed region and the high rotation speed region.

5. The fuel injection controlling system of an internal combustion engine according to claim 2, wherein the corrector is activated when the throttle opening degree (θTH) that is output corresponds to a target idle rotation speed (Neidle) and a deviation between the target idle rotation speed (Neidle) and an actual engine rotation speed (Ne) is larger than a prescribed value.

6. A fuel injection controlling means of an internal combustion engine, comprising:
accelerator manipulating means;
accelerator manipulated variable detection sensing means for detecting a manipulated variable of the accelerator manipulating means;
rotation speed sensing means for detecting a rotation speed of the internal combustion engine;
throttle valve means;
throttle valve drive motor means for opening and closing the throttle valve means in response to the manipulated variable of the accelerator manipulating means;
throttle opening degree sensing means for detecting an opening degree of the throttle valve means; and
controlling means for controlling the throttle valve drive motor means and for computing basic injection time (Ti) of fuel, the controlling means comprising:
memorizing means for memorizing, as a carbon adhesion judgment value (IXREF), a throttle opening degree (θTH) at a moment when a rotation speed (Ne) detected with the rotation speed sensor reaches a target idle rotation speed (NeIdle) by increasing the throttle opening degree (θTH); and
correcting means for correcting the basic injection time (Ti) with the carbon adhesion judgment value (IXREF) so as to correct an air-fuel ratio toward a leaner side as the carbon adhesion judgment value (IXREF) increases;
an Ne—Th map configured to obtain the basic injection time (Ti) of the fuel based on the rotation speed (Ne) and the throttle opening degree (θTH) of the internal combustion engine;
an Ne—Pb map configured to obtain the basic injection time (Ti) of the fuel based on an intake pipe internal negative pressure (Pb) and the throttle opening degree (θTH); and
map selecting means for selecting the Ne—Pb map when the throttle opening degree (θTH) is less than a prescribed map selection standard opening degree (θMAP) and for selecting the Ne—Th map when the throttle opening degree (θTH) is not less than the map selection standard opening degree (θMAP),
wherein the controlling means is configured so that correction of the basic injection time by the corrector is performed with respect to the basic injection time (Ti) of the fuel computed by using the Ne—Th map, and
wherein the controlling means is configured so that correction of the basic injection time by the corrector is not performed with respect to the basic injection time (Ti) of the fuel computed by using the Ne—Pb map.

7. The fuel injection controlling system of an internal combustion engine according to claim 6, wherein the correcting means is configured so that a degree of correction of the basic injection time (Ti) toward a leaner side increases in response to the throttle opening degree (θTH) as the throttle opening degree (θTH) decreases.

8. The fuel injection controlling system of an internal combustion engine according to claim 6, wherein the correcting means is activated when the throttle opening degree (θTH) that is output corresponds to a target idle rotation speed (Neidle) and a deviation between the target idle rotation speed (Neidle) and an actual engine rotation speed (Ne) is larger than a prescribed value.

9. The fuel injection controlling system of an internal combustion engine according to claim 6, wherein the map selecting means is configured so as to use a value as the map selection standard opening degree (θMAP) in a medium rotation speed region among all regions of engine rotation speeds (Ne) including a low rotation speed region including an idle rotation speed and a high rotation speed region including a maximum rotation speed, the value being larger than values in the low rotation speed region and the high rotation speed region.

10. The fuel injection controlling system of an internal combustion engine according to claim 8, wherein the correcting means is activated when the throttle opening degree (θTH) that is output corresponds to a target idle rotation speed (Neidle) and a deviation between the target idle rotation speed (Neidle) and an actual engine rotation speed (Ne) is larger than a prescribed value.

11. The fuel injection controlling system of an internal combustion engine according to claim 6, wherein the internal combustion engine comprises a driving source of a motorcycle.

12. The fuel injection controlling system of an internal combustion engine according to claim 1, wherein the internal combustion engine comprises a driving source of a motorcycle.

* * * * *